United States Statutory Invention Registration [19]

[11] Reg. Number: H612

Baba

[43] Published: Apr. 4, 1989

[54] MOWING APPARATUS

[75] Inventor: Toru Baba, Yokosuka, Japan

[73] Assignee: Kioritz Corporation, Mitaka, Japan

[21] Appl. No.: 873,154

[22] Filed: Jun. 6, 1986

Related U.S. Application Data

[63] Continuation of Ser. No. 697,784, Feb. 4, 1985, abandoned.

[30] Foreign Application Priority Data

Feb. 7, 1984 [JP] Japan ..... 59-15884[U]

[51] Int. Cl.[4] ..... A01D 50/00
[52] U.S. Cl. ..... 56/12.7
[58] Field of Search ..... 56/12.7

[56] References Cited

U.S. PATENT DOCUMENTS

| | | | |
|---|---|---|---|
| 3,826,068 | 7/1974 | Ballas et al. | 56/12.7 |
| 4,043,103 | 8/1977 | Lakin et al. | 56/295 |
| 4,052,789 | 10/1977 | Ballas | 30/276 |
| 4,114,269 | 9/1978 | Ballas, Sr. | 56/127 |
| 4,194,287 | 3/1980 | Palmieri et al. | 30/276 |
| 4,253,238 | 3/1981 | Sheldon | 56/12.7 |
| 4,254,550 | 3/1981 | Satoh | 56/12.7 |
| 4,356,686 | 11/1982 | Lessig, III | 56/12.7 |

*Primary Examiner*—Deborah L. Kyle
*Assistant Examiner*—Michael J. Carone
*Attorney, Agent, or Firm*—Browdy & Neimark

[57] ABSTRACT

A mowing apparatus including a casing containing a cord and operative to rotate while an end portion of the cord is drawn out therefrom. The casing is formed with a cord outlet opening in the form of a slot having a major axis oriented in the direction of rotation of the casing.

1 Claim, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MOWING APPARATUS

This application is a continuation of application Ser. No. 697,784, filed Feb. 4, 1985, now abandoned.

BACKGROUND OF THE INVENTION

This invention relates to mowing apparatus, and more particularly it is concerned with a mowing apparatus having an improved outlet opening for a cord serving as a cutter.

In what is generally referred to as a cord cutter type mowing apparatus using a nylon cord as a cutter, it has hitherto been usual practice to form an outlet opening of a circular shape to draw out the cutter cord from the apparatus for performing mowing operations. The provision of an outlet opening of a circular shape has raised the problem that the cord cutter is violently bent and twisted in all directions in the opening during operation. In the event that the opening is small in size as often happens in a mowing apparatus of small size, the cutter cord suffers damage and is easily broken because the same portion of the cutter cord is repeatedly bent and twisted.

SUMMARY OF THE INVENTION

This invention has as its object the provision of a mowing apparatus of simple construction in which damage to the cord caused by the cord outlet opening can be minimized.

The outstanding characteristic of the invention enabling the aforesaid object to be accomplished is that, in a mowing apparatus comprising a casing containing a cord and operative to rotate while an end portion of the cord is drawn out from the casing to outside, a slot having a major axis oriented in the direction of rotation of the casing is formed to serve as an outlet opening for drawing the cord therethrough from the casing to outside.

The constituent feature of the invention that the mowing apparatus is formed with a cord outlet opening in the form of a slot oriented in the direction of rotation of the casing as described hereinabove offers the advantage that the trouble of the cord being prematurely broken when it is drawn out through the opening of the circular shape of the prior art can be eliminated because the cord drawn out through the slot can be prevented from touching the edge of the slot as much as possible and the cord can be prevented from being bent at the same portion at all times even if a resistance of high magnitude is offered thereto.

DESCRIPTION OF THE PREFERRED EMBODIMENT

A preferred embodiment of the invention will now be described by referring to the accompanying drawings.

Figure 1:
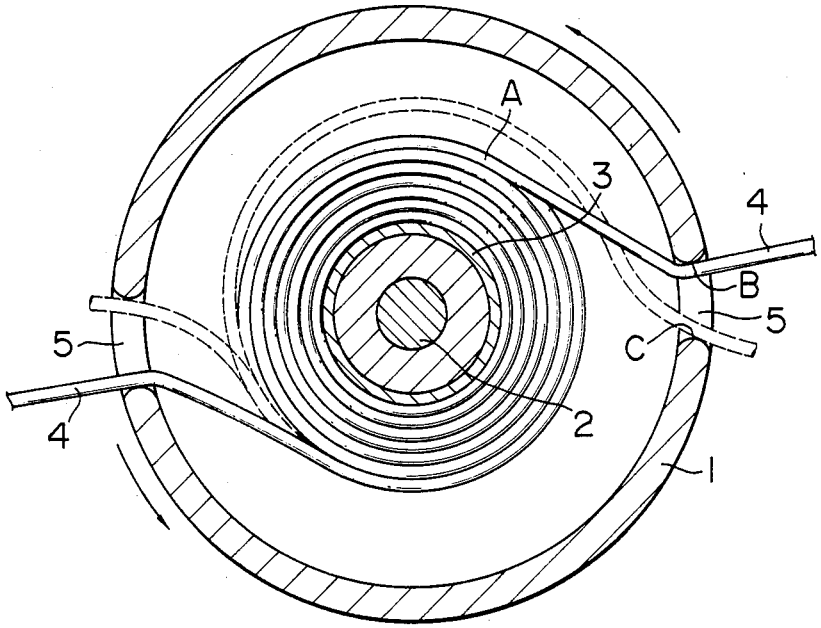
FIG. 1 is a transverse sectional view of the casing of the mowing apparatus comprising one embodiment of the invention.

Referring to FIG. 1, the mowing apparatus according to the invention comprises a casing 1 of a substantially cylindrical configuration secured to a rotary shaft 2 for rotation counterclockwise about the shaft 2 when a mowing operation is performed. Mounted in the casing 1 for rotation together with the casing 1 is a spool 3 which has a cord 4 of nylon as a cutter wound thereon in a plurality of windings. In this embodiment, the cord 4 is wound counterclockwise on the spool 3 and has an end portion drawn out from the casing in a certain length from a circumferentially elongated cord outlet opening 5 formed in a peripheral wall of the casing 1. When a mowing operation is performed, the end portion of the cord cutter 4 drawn out from the casing 1 through the outlet opening 5, spool 3 and casing 1 rotate substantially as a unit and the end portion of the cord 4 drawn out from the opening 5 performs the mowing operation as it is brought to the condition of a rod by centrifugal forces.

Figure 2:
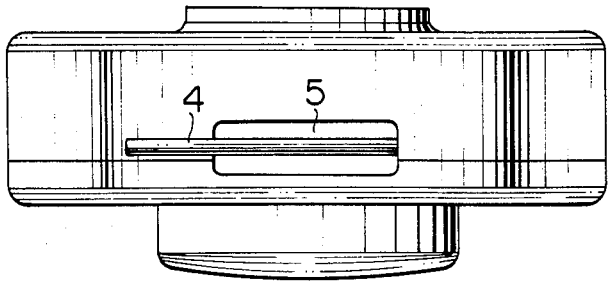
FIG. 2 is a side view of the mowing apparatus shown in FIG. 1.
Figure 3:
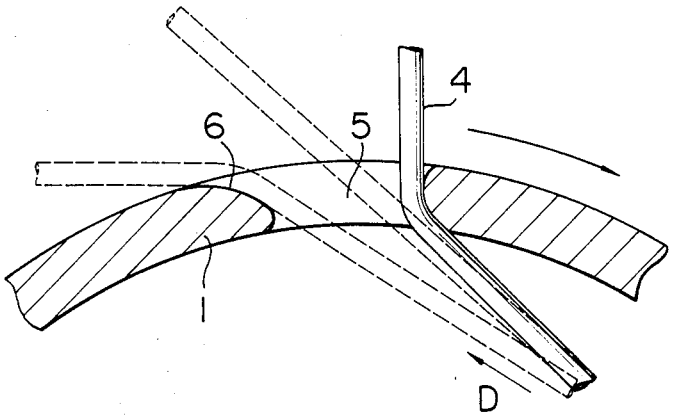
FIG. 3 is a view, on an enlarged scale, of a portion of the mowing apparatus shown in FIG. 1.

As shown in FIG. 2, the opening 5 is in the form of a slot having its major axis oriented in the direction of rotation of the casing 1, i.e. it is elongated circumferentially and is short or narrow in height. The edges of the slot 5 are smooth, i.e. uninterrupted by notches or the like. During a mowing operation, the cord 4 moves between opposite ends of the major axis of the slot 5 depending on whether or not the cord 4 is in contact with grass. FIGS. 1 and 3 show the manner in which the cord 4 behaves in the slot 5. In the figures, solid lines represent a cord 4 before coming into contact with the grass and dotted lines indicate the cord 4 in a position in which it finds itself immediately after cutting the grass. As shown, a position A in which drawing out of the cord 4 from the spool 3 commences (FIG. 1) is close to one end B of the slot 5 which is a leading end of the slot 5 as seen in the direction of rotation of the casing 1 and remote from an opposite end C thereof. Thus, when a resistance of high magnitude is offered to the cord 4, portions of the cord 4 which are brought into contact with the ends B and C differ from each other. Thus, the problem that the same portion of the cord is bent and twisted at all times with which the cord of the prior art was faced can be obviated, making it possible to prevent the cord from being prematurely damaged and broken.

The results of experiments show that excellent results can be achieved by the constituent feature of the invention when the cord outlet slot 5 has a major axis of a dimension in the range between 2d to 10d and a minor axis of a dimension in the range between 1.1d to 3d where d is the diameter of the cord 4.

By contouring the trailing end of the cord outlet slot 5 in section as shown in FIG. 3 to provide a tilting surface portion 6 inclined in a cord drawing direction D and rounded in the direction of thickness, it is possible to improve the performance of the cord outlet slot 5 in preventing damage to the cord 4. It can be seen in FIG. 3 that the cord 4 bends at a point about the leading end of the slot different than the point at which it bends about the trailing end of the slot. Thus, as indicated above, portions of the cord 4 which are brought into contact with the respective ends of the slot differ from each other.

What is claimed is:

1. A mowing apparatus comprising:

a casing containing a cord wound on a spool and operative to rotate while an end portion of said cord is drawn out from the casing;

wherein the improvement comprises:

a cord outlet opening formed in said casing in the form of a circumferentially elongated slot having a major axis of a dimension in the range between 2d and 10d oriented in the direction in which said casing rotates with a leading end and a trailing end, and a minor axis of a dimension in the range between 1.1d to 3d where d is the diameter of said cord, said trailing end of said cord outlet opening being in the form of a tilting surface portion inclined in a cord drawing direction and rounded in the direction of thickness such that said cord bending about the leading end of said slot bends at a point along its length different from where said cord bends about the trailing end of the slot, said elongated slot being defined by smooth edges uninterrupted by notches.

* * * * *